United States Patent
Naujok et al.

(10) Patent No.: US 11,483,710 B2
(45) Date of Patent: Oct. 25, 2022

(54) SUBSCRIBER ACCOUNT IDENTIFIER TRANSFER IN A TELECOMMUNICATIONS SYSTEM

(71) Applicant: Payfone, Inc., New York, NY (US)

(72) Inventors: Jeffrey Naujok, Colorado Springs, CO (US); Christopher Cunningham, Highlands Ranch, CO (US); Greg Bonin, Denver, CO (US)

(73) Assignee: Prove Identity, Inc., New York, NY (US)

( * ) Notice: Subject to any disclaimer, the term of this patent is extended or adjusted under 35 U.S.C. 154(b) by 0 days.

(21) Appl. No.: 17/109,038

(22) Filed: Dec. 1, 2020

(65) Prior Publication Data

US 2022/0174478 A1    Jun. 2, 2022

(51) Int. Cl.
*H04W 8/20* (2009.01)
*H04W 12/30* (2021.01)

(52) U.S. Cl.
CPC ............ *H04W 12/35* (2021.01); *H04W 8/20* (2013.01)

(58) Field of Classification Search
CPC .......... H04W 4/02; H04W 4/80; H04W 48/04
See application file for complete search history.

(56) References Cited

U.S. PATENT DOCUMENTS

| | | |
|---|---|---|
| 7,181,197 B2 | 2/2007 | Clayton |
| 7,221,749 B2 | 5/2007 | Chiczewski |
| 11,223,943 B2 | 1/2022 | Desai |
| 2008/0261561 A1 | 10/2008 | Gehrmann |
| 2010/0100939 A1 | 4/2010 | Mahaffey |
| 2011/0019811 A1 | 1/2011 | May |
| 2011/0151843 A1 | 6/2011 | Deuel |

(Continued)

FOREIGN PATENT DOCUMENTS

| | | |
|---|---|---|
| WO | WO2020167977 | 8/2020 |
| WO | WO2022015611 | 1/2022 |

OTHER PUBLICATIONS

PCT Application as filed on Dec. 1, 2020, Application No. PCT/US20/62755, 57 pages.

(Continued)

*Primary Examiner* — Michael T Vu
(74) *Attorney, Agent, or Firm* — Berkeley Law & Technology Group

(57) ABSTRACT

Example methods, apparatuses, and/or articles of manufacture may be implemented to utilize a computing device to receive, from a communications network, a first signal to indicate that a subscriber, such as a subscriber of a mobile communication services carrier, has initiated an electronic transaction. The method may include detecting, utilizing one or more data stores, a record of a transfer of a subscriber account identifier and, in response, determining whether the transfer corresponds to a porting event initiated by a subscriber or initiated by a communication services carrier. The method may further include transmitting at least a second signal on the communications network, in which the at least the second signal indicates authentication, authorization, and/or verification of the electronic or digital transaction responsive to determining whether the transfer corresponds to a porting event initiated by a subscriber or corresponds to an event initiated by a communication services carrier.

19 Claims, 6 Drawing Sheets

(56) References Cited

U.S. PATENT DOCUMENTS

| | | |
|---|---|---|
| 2012/0303455 A1 | 11/2012 | Busch |
| 2013/0003958 A1 | 1/2013 | Brown |
| 2013/0024375 A1 | 1/2013 | Choudhuri |
| 2014/0164178 A1 | 6/2014 | Adjaoute |
| 2014/0199962 A1 | 7/2014 | Mohammed |
| 2014/0247144 A1 | 9/2014 | Proud |
| 2015/0026027 A1 | 1/2015 | Priess |
| 2015/0033337 A1 | 1/2015 | Baikalov |
| 2015/0039513 A1 | 2/2015 | Adjaoute |
| 2015/0178715 A1 | 6/2015 | Buhrmann |
| 2015/0230088 A1 | 8/2015 | Barkan |
| 2015/0269578 A1* | 9/2015 | Subramanian ......... G06Q 20/12 |
| | | 705/44 |
| 2017/0053107 A1 | 2/2017 | Nahari |
| 2017/0289796 A1* | 10/2017 | Raleigh ................. H04L 63/062 |
| 2018/0212971 A1 | 7/2018 | Costa |
| 2019/0347431 A1 | 11/2019 | Nair |
| 2020/0104876 A1 | 4/2020 | Chintakindi |
| 2020/0260258 A1 | 8/2020 | Desai |
| 2022/0012743 A1 | 1/2022 | Snell |
| 2022/0129900 A1 | 4/2022 | Naujok |
| 2022/0159449 A1 | 5/2022 | Desai |
| 2022/0174478 A1 | 6/2022 | Naujok |

OTHER PUBLICATIONS

Notification of the International Application Number and of the International Filing Date, PCT Application No. PCT/US20/62755, dated Dec. 22, 2020, 1 page.
Notification Concerning Payment of Prescribed Fees, PCT Application No. PCT/US20/62755, mailed Dec. 22, 2020, 2 pages.
International Search Report and Written Opinion, PCT Application No. PCT/US20/62755, dated Feb. 19, 2021, 13 pages.
U.S. Appl. No. 17/372,493, filed Jul. 11, 2021, 98 pages, Doc 1753.
U.S. Appl. No. 17/372,493: Filing Receipt dated Jul. 27, 2021, 3 pages, Doc 1754.
U.S. Appl. No. 17/372,493: Notice of Publication dated Jan. 13, 2022, 1 page, Doc 1755.
PCT/US2021/041205: PCT Application filed Jul. 11, 2021, 93 pages, Doc 1756.
PCT/US2021/041205: Invitation to Correct Defects dated Jul. 28, 2021, 2 pages, Doc 1757.
PCT/US2021/041205: Response to Invitation to Correct Defects filed Sep. 14, 2021, 4 pages, Doc 1758.
PCT/US2021/041205: International Search Report and Written Opinion dated Oct. 20, 2021, 9 pages, Doc 1759.
PCT/US2021/041205: Article 34 Amendment and Chapter II Demand filed May 5, 2022, 18 pages, Doc 1761.
U.S. Appl. No. 17/081,685, filed Oct. 27, 2020, 72 pages, Doc 1762.
U.S. Appl. No. 17/081,685: Filing Receipt dated Nov. 6, 2020, 4 pages, Doc 1763.
U.S. Appl. No. 17/081,685: Corrected Filing Receipt dated Mar. 28, 2022, 4 pages, Doc 1764.
U.S. Appl. No. 17/081,685: Non-final Office Action dated May 3, 2022, 30 pages, Doc 1765.
PCT/US2021/056699: PCT Application filed Oct. 26, 2021, 72 pages, Doc 1766.
PCT/US2021/056699: Invitation to Correct Defects in the International Application dated Nov. 16, 2021, 2 pages, Doc 1767.
PCT/US2021/056699: Response to Invitation to Correct Defects in the International Application filed Jan. 13, 2022, 2 pages, Doc 1768.
PCT/US2021/056699: Intl Search Report and Written Opinion dated Jan. 28, 2022, 66 pages, Doc 1769.
U.S. Appl. No. 16/789,199, filed Feb. 12, 2020, 48 pages, Doc 1770.
U.S. Appl. No. 16/789,199: Filing Receipt and Notice to File Corrected Application Papers dated Mar. 3, 2020, 6 pages, Doc 1771.
U.S. Appl. No. 16/789,199: Respose to Notice to File Corrected Application Papers dated Mar. 23, 2020, 11 pages, Doc 1772.
U.S. Appl. No. 16/789,199: Updated Filing Receipt dated Mar. 26, 2020, 4 pages, Doc 1773.
U.S. Appl. No. 16/789,199: Notice of Publication dated Aug. 14, 2020, 1 page, Doc 1774.
U.S. Appl. No. 16/789,199: Non-final Office Action dated May 12, 2021, 18 pages, Doc 1775.
U.S. Appl. No. 16/789,199: Amendment filed Aug. 12, 2021, 14 pages, Doc 1776.
U.S. Appl. No. 16/789,199: Notice of Allowance / Allowability dated Sep. 1, 2021, 10 pages, Doc 1777.
U.S. Appl. No. 16/789,199: Issue Fee Payment and Comments on Reasons for Allowance filed Dec. 1, 2021, 12 pages, Doc 1778.
U.S. Appl. No. 16/789,199: 312 Amendment filed Dec. 1, 2021, 9 pages, Doc 1779.
U.S. Appl. No. 16/789,199: Corrected Notice of Allowability and Examiner Response to 312 Amendment dated Dec. 14, 2021, 4 pages, Doc 1780.
U.S. Appl. No. 16/789,199: Issue Notification dated Dec. 21, 2021, 1 page, Doc 1781.
U.S. Appl. No. 17/539,810, filed Dec. 1, 2021, 67 pages, Doc 1782.
U.S. Appl. No. 17/539,810: Filing Receipt and Notice to File Corrected Application Papers dated Dec. 14, 2021, 6 pages, Doc 1783.
U.S. Appl. No. 17/539,810: Response to Notice to File Corrected Application Papers filed Jan. 28, 2022, 9 pages, Doc 1784.
U.S. Appl. No. 17/539,810: Response to Notice of Incomplete Reply filed Feb. 3, 2022, 11 pages, Doc 1785.
U.S. Appl. No. 17/539,810: Updated Filing Receipt dated Feb. 8, 2022, 4 pages, Doc 1786.
U.S. Appl. No. 17/539,810: Notice of Publication dated May 19, 2022, 1 page, Doc 1787.
PCT/US2020/017966: PCT Application filed Feb. 12, 2020, 51 pages, Doc 1789.
PCT/US2020/017966: International Search Report and Written Opinion dated Jun. 25, 2020, 18 pages, Doc 1790.
PCT/US2020/017966: Article 34 Amendment and Chapter II Demand filed Oct. 23, 2020, 20 pages, Doc 1791.
PCT/US2020/017966: International Preliminary Report on Patentability dated Feb. 17, 2021, 20 pages, Doc 1792.
CA3,130,202: CA National Phase Application filed Aug. 12, 2021, 41 pages, Doc 1801.
PCT/US2020/062755: PCT Application filed Dec. 1, 2020: PCT Application filed Dec. 1, 2020, 55 pages, Doc 1798.
PCT/US2020/062755: PCT Application filed Dec. 1, 2020 International Search Report and Written Opinion dated Feb. 19, 2021, 12 pages, Doc 1799.
U.S. Appl. No. 17/690,935, filed Mar. 9, 2022, 65 pages, Doc 1800.
U.S. Appl. No. 17/690,935: Filing Receipt dated Mar. 14, 2022, 3 pages, Doc 1802.
U.S. Appl. No. 17/081,685 / Atty Ref No. 189.P015: Response to Non-final Office Action dated Jun. 22, 2022, 18 pages, Doc 1840.

* cited by examiner

SUBSCRIBER ACCOUNT IDENTIFIER TRANSFER IN A TELECOMMUNICATIONS SYSTEM

BACKGROUND

1. Field

The present disclosure relates generally to approaches toward detection of events, such as porting events, that relate to transfer and/or reassignment of a subscriber account identifier, such as a telephone number, of a mobile communications device operating within a telecommunications infrastructure.

2. Information

The World Wide Web or simply the Web, as provided by the Internet, has grown rapidly in recent years at least partially in response to the relative ease by which a wide variety of types of transactions can be performed or enabled via the Internet. In an environment in which electronic- and/or Internet-based commerce takes place on a grand scale, occurrences of fraud and deception can, unfortunately, frequently occur. To reduce the instances of fraud and deception, various fraud-protection processes and/or procedures have been developed and utilized. Such procedures are employed, for example, in connection with everyday online or electronic transactions, which may include financial transactions, establishment of lines of credit, in-store purchases for goods and/or services, or the like.

In an environment in which various electronic devices typically used for communications, such as smart phones, tablet computing devices, laptop computers, etc., have become ubiquitous, techniques for accomplishing fraud have become more sophisticated, such as perhaps involving use and/or knowledge of complex technology, for example, related to the particular hardware and/or software platforms associated with such smart phones, tablets, laptop computers, etc. Thus, attempts to reduce the instances of fraud and deception, which may involve, for example, use of various electronic devices, continues to be an active area of investigation.

SUMMARY

One general aspect concerns a method that includes receiving, at a server coupled to a network, a first signal indicating that a subscriber to a communication services carrier has initiated an electronic or digital transaction. The method also includes accessing one or more data stores to determine whether a subscriber account identifier has recently undergone a transfer from a first communication services carrier to a second communication services carrier. The method also includes detecting whether the transfer corresponds to an event initiated by a subscriber or corresponds to an event initiated by the communication services carrier. The method also includes generating at least a second signal by the server coupled to the network. The method also includes the at least the second signal operating to authenticate, authorize, and/or verify the electronic or digital transaction in response to the transfer being initiated by the subscriber. In an alternative, the at least the second signal indicates a denial of authentication, authorization, and/or verification in response to the transfer being initiated by the communication services carrier.

Particular embodiments of the method may include additional features, such as the porting event initiated by the subscriber corresponding to a request by the subscriber to port the subscriber account identifier from the first communication services carrier to the second communication services carrier. Particular embodiments of the method may also include the electronic or digital transaction corresponding to an electronic or digital transaction that provides access to privileged content (and/or privileged data parameters) and wherein the denial corresponds to denying authorization of the access to the privileged content/data parameters. In particular embodiments, the electronic or digital transaction may comprise accessing parameters relating to at least one of a service account, a financial account, an account relating to medical information, an account relating to access to premium content, an account that provides purchase and/or rental of goods and/or services, access to corporate or organization confidential information as well as privileged content or parameters, or any combination thereof. Particular embodiments of the method may also include the transfer initiated by the communication services carrier corresponding to a snapback event. Particular embodiments of the method may also include requesting, by the server coupled to the network, one or more additional parameters from the subscriber, after generating the at least the second signal representing the denial of authentication, authorization, and/or verification. Particular embodiments of the method may also include generating an authentication, authorization, and/or verification signal in response to obtaining the one or more additional parameters from the subscriber. Particular embodiments of the method may also include the subscriber account identifier corresponding to a telephone number. Particular embodiments of the method may also include the at least the second signal representing the denial of authentication, authorization, and/or verification being generated, at least in part, responsive to the communication services carrier deleting at least a portion of a subscription version record corresponding to the subscriber account identifier. Particular embodiments of the method may also include the at least the second signal representing the denial of authentication, authorization, and/or verification being generated, at least in part, responsive to the communication services carrier transferring the subscriber account identifier to a subsidiary of the communication services carrier. Particular embodiments of the method may also include the transferring corresponding to a transfer of the subscriber account identifier occurring within a time window.

Another general aspect includes a server having at least one processor communicatively coupled to at least one memory to initiate reception, from a communications network, of at least a first signal to indicate that a subscriber of a mobile communication services carrier has initiated an electronic or digital transaction. The at least one processor communicatively coupled to the at least one memory may also detect, via accessing one or more data stores, an occurrence of a recent transfer of a subscriber account identifier. The at least one processor communicatively coupled to the at least one memory may also determine, responsive to detecting the recent transfer, whether the recent transfer corresponds to a porting event initiated by a subscriber event or corresponds to an event initiated by a communication services carrier. The at least one processor communicatively coupled to the at least one memory may also transmit at least a second signal on the communications network, the at least the second signal to indicate a status of authentication, authorization, and/or verification of the electronic or digital transaction responsive to determining whether the recent transferring corresponds to a porting event initiated by a subscriber or corresponds to an event initiated by a communication services carrier.

In particular embodiments, the at least one processor communicatively coupled to the at least one memory is additionally to delete at least a portion of a subscription version record corresponding to the subscriber account identifier. In particular embodiments, the subscriber account identifier corresponds to a telephone number. In particular embodiments, the porting event corresponds to a carrier-initiated transfer of the subscriber account identifier from a first communication services carrier to a second communication services carrier. In particular embodiments, the at least the second signal is to indicate authentication, authorization, and/or verification of the electronic or digital transaction responsive to determining that the recent transfer corresponds to the porting event initiated by the subscriber. In particular embodiments, the at least the second signal is to indicate denial of authentication, authorization, and/or verification of the electronic or digital transaction responsive to determining that the recent transfer corresponds to a porting event initiated by the communication services carrier.

One general aspect includes an article including a non-transitory storage medium having instructions stored thereon executable by a special-purpose computing platform to initiate reception, from a communications network, of at least a first signal to indicate that a subscriber of a device has initiated an electronic or digital transaction. The article may additionally include instructions to detect, via accessing one or more data stores, an occurrence of a recent transfer of a subscriber account identifier. The article may additionally include instructions to determine, responsive to detecting the recent transfer, whether the recent transfer corresponds to a porting event initiated by a subscriber or corresponds to an event initiated by a communication services carrier. The article may additionally include instructions to transmit an approval signal on the communications network, the approval signal to indicate authentication, authorization, and/or verification of the electronic or digital transaction based, at least in part a determination that the recent transfer corresponds to a porting event initiated by a subscriber.

In particular embodiments, the executable instructions are additionally to transmit, on the communications network, a signal representing denial of authentication, authorization, and/or verification of the electronic or digital transaction responsive to determining that the recent transfer corresponds to a first communication services carrier, or second communication services carrier, deleting of at least a portion of a subscription version record corresponding to the subscriber account identifier. In particular embodiments, the executable instructions are additionally to transmit a request for one or more additional parameters to the subscriber. In particular embodiments, the executable instructions are additionally to transmit the approval signal on the communications network based, at least in part, on receipt of the one or more additional parameters from the subscriber. In particular embodiments, the executable instructions indicate that the subscriber account identifier corresponds to a telephone number.

BRIEF DESCRIPTION OF THE DRAWINGS

Claimed subject matter is particularly pointed out and distinctly claimed in the concluding portion of the specification. However, both as to organization and/or method of operation, features, and/or advantages thereof, it may best be understood by reference to the following detailed description if read with the accompanying drawings in which:

Figure 1:
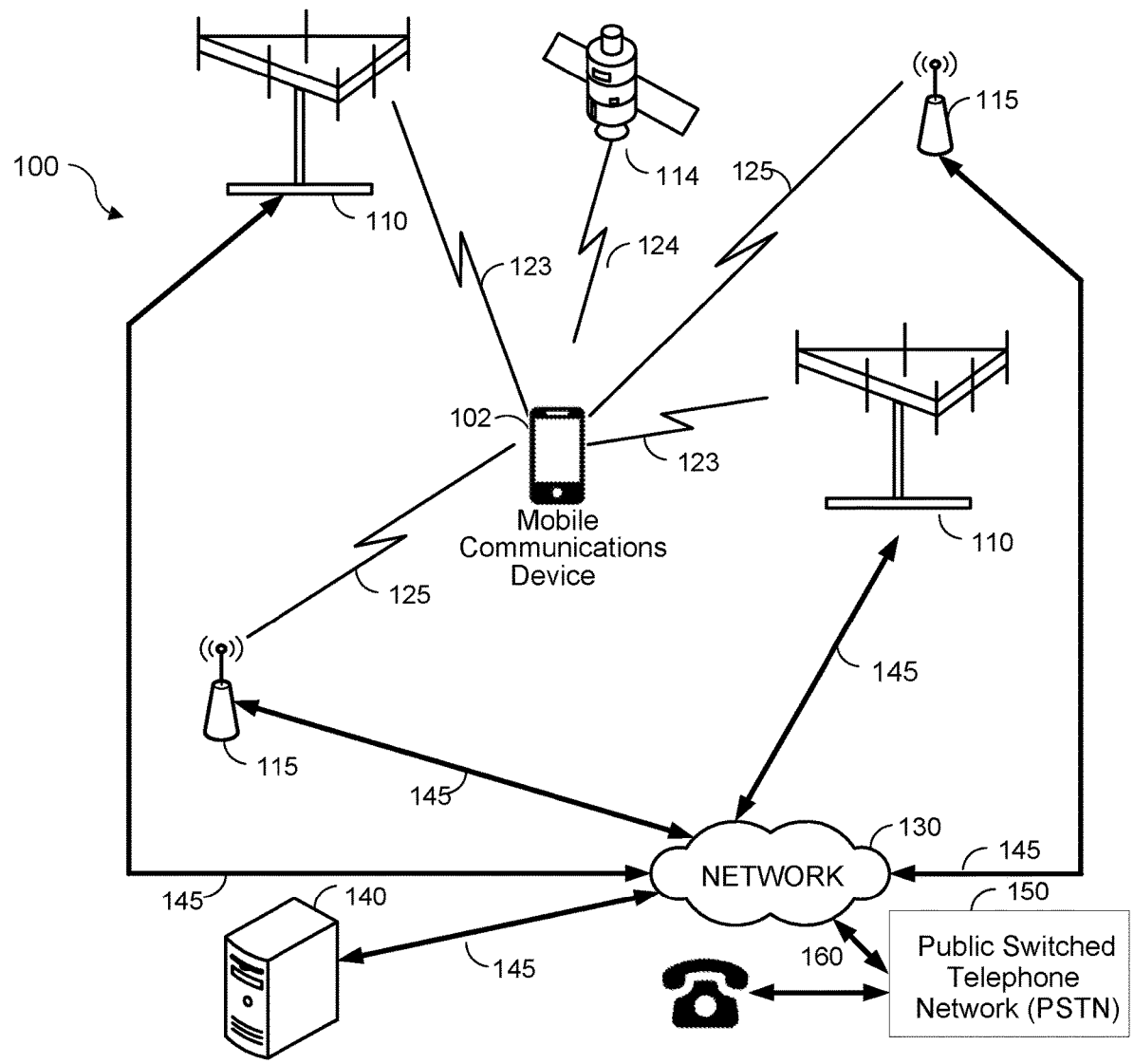
FIG. 1 is a diagram of a telecommunications infrastructure, according to various embodiments.

Reference is made in the following detailed description to the accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others, one or more aspects, properties, etc. may be omitted, such as for ease of discussion, or the like. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification, are not necessarily intended to refer to the same implementation and/or embodiment or to any one particular implementation and/or embodiment. Furthermore, it is to be understood that particular features, structures, characteristics, and/or the like described, are capable of being combined in various ways in one or more implementations and/or embodiments and, therefore, are within intended claim scope. In general, of course, for the specification of a patent application, these and other issues have a potential to vary in a particular context of usage. In other words, throughout the disclosure, particular context of description and/or usage provides guidance regarding reasonable inferences to be drawn; however, likewise, the term "in this context" in general without further qualification refers at least to the context of the present patent application. As discussed herein, auditing, authorizing, and/or authentication represent possible approaches, among many possible approaches, to reduce the risk of fraud. Other approaches or portions thereof, such as identity verification, authorization, auditing, and/or authorizing, or the like may also be used herein, in whole or in part, such as part of, in addition to, and/or in conjunction with auditing, authorizing, and/or authenticating a transacting party as such may be employed to prevent, or to at least reduce the incidence of, allowing fraudulent electronic or digital transactions to take place.

In an environment in which electronic communication devices, such as landline or wireline telephones, voice over Internet protocol (VoIP) communications devices, etc., have become ubiquitous, a communications device user may wish to engage in an electronic or digital transaction (e.g., an electronic financial transaction, a purchase of an asset, withdrawal of funds, and so forth) utilizing such electronic communications devices. Prior to initiating a transaction, a user of an electronic communications device may establish an identity, such as may be established in connection with an electronic communications device subscriber account, with a cellular or mobile communications device services carrier, a VoIP services provider, or other type of telecommunications carrier. Establishment of an electronic communications device subscriber account, utilizing, for example, a subscriber account identifier, may permit the identity of an individual attempting to engage in an electronic or digital transaction to be authenticated, authorized, and/or verified. In some instances, given the nature of electronic or digital transactions, such as in an environment in which electronic or digital transactions may be initiated via a communications network at any time and at any location, it may be useful to be able to perform verifying, auditing, authorizing, and/or authenticating operations relatively quickly, such as in a real-time fashion or with reduced delay.

As a general matter, authentication, authorization, and/or verification of a transacting party, such as via use of a mobile device, may be desirable in response to an institution or organization (e.g., third party, etc.) seeking to authenticate, authorize, and/or verify the identity of a transacting party (e.g., a mobile subscriber). Authenticating, authorizing, and/ or verifying may involve establishing a correspondence and/or association of a transacting party with a persistent mobile subscriber account identifier, as demonstrated below through illustrative examples. In this context, a correspondence, association, and/or similar terms refer to a persistent, continuing and objectively verifiable relationship between a transacting party in possession of, for example, a particular mobile communications device. Thus, a subscriber account identifier may be employed to signify and/or identify a particular transacting party. In this context, the term "mobile communications device identity" and/or similar terms refer to an identity that relies on a mobile communications device account relationship (also referred to as a correspondence and/or association) of a user as a source of authenticating, authorizing, and/or verifying a transacting party and is capable of being verified by another (e.g., a third-party auditing, authorizing and/or verifying entity). The term "mobile subscriber device account" and/or similar terms in this context refer to a mobile communication services provider account. The terms "mobile communications device services provider," "mobile communications device carrier," "mobile network operator" may be used interchangeably. Furthermore, in this context, the term "mobile device services carrier," "telecommunication services carrier," "service carrier," or simply "carrier" may refer to an entity of a telecommunications infrastructure that provides wired and/ or wireless communication services to the general public for a consideration, such as a monthly subscription fee.

Thus, a carrier (e.g., a telecommunication services carrier) may comprise a mobile communication services provider and/or mobile network operator. However, there are examples of carriers that may not correspond to mobile communications device services providers and/or mobile network operators. Such instances may include wireline services providers (for example, providers of services operating within the public switched telephone network or PSTN), which include wireline services for rotary dial telephones and/or telephones utilizing, for example, dual tone multi-frequency (DTMF) signaling. Accordingly, the terms "services carrier" or simply "carrier" may be used in place of a mobile communications device services provider and/or wireline telephone services provider without a loss in meaning and/or understanding. In a given situation, particular context of usage should indicate if a term is being used in its most general sense or in a narrow sense, such as referring to a mobile communications device services provider, wireline services provider, mobile paging services provider, and/or mobile network operator, for example.

It is noted that while a correspondence or association between a transacting party and a mobile communications device need not be long-term, such correspondence or association between a transacting party and a mobile communications device should imply some amount of persistence to be of use in this context. Other aspects of auditing, authorizing, and/or authentication are described in greater detail later. As noted, in an embodiment, authenticating, authorizing, and/or verifying a transacting party, may relate to a mobile account and/or a mobile subscriber, for example. As mentioned, a mobile subscriber account is one example of a type of subscriber account, especially in a networked electronic commerce environment, although claimed subject matter is not intended to be limited to online accounts or to mobile accounts. Rather, the term "account" or "subscriber account" in this context refers to a formal business arrangement between an entity, person, or other type of transacting party, and a provider of the account in order to accomplish a business purpose, for example. It is noted, for purposes of clarification, that in some situations, a person may represent an entity. The term "account" is intended to be broadly interpreted as an arrangement that provides a capability to access certain privileged content or parameters. In this context, account information or account parameters includes information regarding a service account, a financial account, an account relating to medical information, an account relating to access to premium content (e.g., premium sports, cinema, or other entertainment content), an account that provides purchase and/or rental of goods and/or services, access to corporate and/or organizational intellectual property and/or other types of records. Also in this context, the terms "privileged content" or "privileged parameters" are intended to be interpreted broadly and to encompass any type of content available exclusively to certain individuals and/or certain entities in response to supplying certain credentials. Accordingly, examples of "privileged content" or "privileged parameters" may encompass information or parameters that permit a person or entity to engage in a transaction related to a service account, a financial account, an account relating to medical information, an account relating to access to premium content, an account that provides purchase and/or rental of goods and/or services, an account that provides access to corporate and/or organizational intellectual property, an account that provides access to a social network and/or social network profile, as well as any other types of records. Also in this context the term "parameters" refers to a numerical or other measurable factor capable of defining a system and/or sets conditions for operation of a system. Thus, for example, a set of parameters may include data or information stored via a non-transitory memory that form or define, at least in part, an electronic representation of the state of a mobile subscriber.

Likewise, an account may comprise attributes associated with or corresponding to the account. In this context, the term "subscriber account identifier" refers to a unique descriptor or feature associated with the account that at least partially defines certain aspects of the account. For example, as nonlimiting illustrations, with respect to a mobile device user, a subscriber account identifier may include a mobile telephone number, a mobile subscriber unique alias, an international mobile subscriber identifier (IMSI), Integrated Circuit Card Identifier (ICC ID), and/or other type of identifier (e.g., a unique identifier) employed in connection with the particular mobile network operator or the mobile communication services provider. Mobile communications networks may include those compatible or compliant with a Global System for Mobile Communications (GSM) telecommunications network, for example. Other examples of mobile subscriber account identifiers may include an international mobile equipment identifier (IMEI), a mobile equipment identifier or any other identifier a mobile billing account number/identifier.

Some example methods, apparatuses, and/or articles of manufacture are disclosed herein that may be used, in whole or in part, to facilitate and/or support one or more operations and/or techniques that relate to pre-port detection in a communication services carrier, such as may be implemented in connection with a processor-equipped cellular mobile communications device (which may be referred to herein as a "mobile communications device") communicating with one or more computing devices via the one or more communication networks utilizing one or more communications protocols (e.g., network protocols, etc.) discussed herein. In this context, the term "article" refers to an article of manufacture as well as a data or memory structure having instructions stored thereon. The mobile communications device may be utilized to authenticate, authorize, and/or verify a transacting party, so as to permit an electronic or on-line transaction to take place. Such electronic or on-line transactions, which may herein be referred to as simply "transactions," may involve transactions related to one or more financial accounts, such as accounts that relate to a line of credit, a mobile communication device services account, a bank account, a brokerage account, and so forth. In this context, a "transacting party" refers to an entity, such as an individual subscriber, who may attempt to engage in, and/or facilitate, an electronic or on-line transaction.

In this context, the term "port" or "porting" refers to an action, such as may be initiated by a mobile communications device subscriber or by a communication services carrier, to transfer ownership of (or to reassign ownership) a subscriber account identifier from a first communication services carrier to a second communication services carrier. Such subscriber account identifiers may include (as previously mentioned) a mobile telephone number, a mobile subscriber unique alias, an international mobile subscriber identifier (IMSI), Integrated Circuit Card Identifier (ICC ID), just to name a few nonlimiting examples. In this context, the transferring or reassigning of a subscriber account identifier from a first service carrier to a second service carrier transfers a responsibility to provide services to a corresponding mobile device. Such services may include providing voice and data communication services, wireless Internet browsing, texting, and so forth. For example, a subscriber-initiated porting of a telephone number (corresponding to a particular mobile device) from a first communication services carrier to a second communication services carrier may occur in response to the subscriber obtaining more competitive terms (e.g., monthly subscriber fees) from the second service carrier compared to terms offered by the first service carrier. In another example, a subscriber-initiated porting of a telephone number may occur in response to the subscriber obtaining access to a wireless communications network having other desirable features, such as a larger wireless services coverage area, increased wireless data communications rates, decreased interrupted (e.g., dropped) telephone calls, higher voice quality, or the like, or any combination thereof.

In particular embodiments, a subscriber account identifier may be transferred or reassigned or transferred any number of times. For example, a mobile subscriber may initially obtain a subscriber account identifier (e.g., a telephone number) from a first communication services carrier as part of an introductory offer to obtain mobile communication services. After expiration of an initial agreed-to duration, the mobile subscriber may, for example, port the subscriber account identifier from the first communication services carrier to a second service carrier as part of, for example, an incentive program to switch to the second service carrier. After expiration of a second agreed-to duration, the mobile subscriber may initiate a porting operation to transfer or reassign the subscriber account identifier from the second communication services carrier to a third communication services carrier, perhaps to obtain communication services over a different (e.g., larger) geographical area than that provided by the second communication services carrier.

As previously mentioned, a communication services carrier, rather than a subscriber, may initiate a porting event to transfer or reassign a subscriber account identifier from a first carrier to a second carrier. In particular embodiments, porting events initiated by a communication services carrier may include a second communication services carrier returning a previously ported subscriber account identifier to a first communication services carrier. For example, in some embodiments, responsive to a subscriber (of a second communication services carrier) no longer adhering to contract terms (e.g., no longer making timely payment for services provided by a communication services carrier, violating other contract terms, etc.), a service contract provided by the second communication services carrier may be terminated. Responsive to such termination, a subscriber account identifier may be ported back to the originating (e.g., first) communication services carrier. In particular embodiments, a porting event performed by a communication services carrier in response to a service termination may be referred to as a "snapback" event.

In particular implementations, a subscriber-initiated porting of a subscriber account identifier from a first communication services carrier to a second communication services carrier may be followed by the second communication services carrier generating a record of such porting. Accordingly, in response to a desire to authenticate, authorize, and/or verify a mobile subscriber, such as prior to permitting the mobile subscriber to engage in a financial transaction, a financial institution, for example, may access a data store to determine whether a subscriber account identifier has recently undergone a transfer or reassignment. Such transfers may be indicative of a mobile subscriber attempting to fraudulently engage in a transaction. However, in particular embodiments, in response to detecting that the transfer corresponds to a porting event initiated by a subscriber, a financial institution may access a record of such subscriber initiation and, consequently, permit the transaction to proceed.

Conversely, in particular embodiments, a transfer may correspond to a porting event initiated by a communication services carrier, such as a second communication services carrier returning a previously ported subscriber account identifier to a first communication services carrier, a record of such porting event may not exist. Accordingly, in response to a desire to authenticate, authorize, and/or verify a mobile subscriber, such as prior to permitting the mobile subscriber to engage in a financial transaction, a financial institution, for example, may access a data store to determine whether a subscriber account identifier has recently undergone a transfer. In particular embodiments, responsive to an absence of any type of service record, a financial institution, for example, may conclude that a mobile subscriber may be attempting to engage in a fraudulent electronic financial transaction.

Although the discussion that follows relates to any type of account, as a non-limiting illustration, mobile accounts may be used for illustration. However, it is understood, of course, that claimed subject matter is intended to not be limited to examples provided primarily for purposes of illustration, since such examples may be oversimplified for purposes of comprehension, for example. As mentioned previously, with respect to commerce, including, of course, mobile accounts, a risk of fraud and/or unauthorized actions taking place is present.

The following provides a few illustrative examples of accounts in which a risk of fraud and/or unauthorized actions may exist. A mobile subscriber may attempt to access a bank account via a voice call, a web browser, or by utilizing an executable application on a mobile communications device, for example. Thus, a bank, lender, brokerage firm, or any other type of financial institution, in response to the attempt to access the bank account, may employ an application programming interface (API) substantially compatible and/or substantially compliant with HTTP and/or HTTPS, including versions now known and/or to be later developed, and/or another suitable protocol (e.g., now known and/or to later be developed). In the foregoing example, a user may seek to take one or more actions with respect to an account, such as, for example, establishing an account, transferring funds, viewing a history of electronic or digital transactions, updating privileged content and/or parameters, etc.

Thus, as suggested, a user may seek to access, for example, an online account. A third party, such as those who may provide such an account, may seek to provide an appropriate level of access control for such reasons as maintaining confidentiality of customer information. In an example, a software company and/or product, such as a developer of tax-preparation software products, permit individual user accounts to be established. It may also be appreciated that similar protections may be instituted in which confidentiality may not be an aspect. For example, with regard to management of certain types of privileged content and/or parameters, a user may seek to access such content in connection with an online subscription to a major newspaper. In another instance, a user may desire to access privileged content and/or parameters, whether such content corresponds to personalized content (e.g., of a social media network) or does not correspond to personalized content, such as premium sports-related content. In another instance, a user may be returning to a website and/or application, and accessing the website or application could be dependent, at least partially, on binding a user with a website and/or with an application, such as via an account for the user. In another example, a user may actuate a 'click-to-call' button of a website and/or application to reach customer care. Thus, a third party may comprise a customer care facility of an enterprise, for example, such as a care facility of a bank, in which an account is established. Yet another scenario may involve confidentiality associated with medical records of patients, such as compliance with HIPAA, the Affordable Care Act, Electronic Medical Records, and/or other regulatory schemes. A variety of potential situations may arise in which a user may seek access to records, such as a patient, a company, such as for insurance, a hospital, a medical professional providing care, etc. Thus, again, a user or authorized agent may log into a user's medical record account that may exist online and/or be stored electronically, such as on a website. As yet another example, a variety of corporate programs, including as examples, airline mileage accounts, gift cards, etc., in which value has been accumulated, may be managed as online accounts. Thus, all of the foregoing examples and many more accounts are subject to risk associated with fraud and/or unauthorized actions by an unscrupulous individual.

Thus, in possible scenarios, an unscrupulous individual may attempt to engage in a fraudulent electronic or digital transaction utilizing a subscriber account identifier of a mobile communications device that corresponds to a mobile communications device of a different user. However, by accessing a data store, a financial institution, for example, may challenge credentials of the unscrupulous individual, such as by accessing a data store to detecting whether a transfer (e.g., a porting event) associated with the purported subscriber's account identifier has recently occurred. If a transfer event has recently occurred, the financial institution may consult a subscription version record, which may determine if such transferring (e.g., a porting event initiated by a subscriber) has recently occurred. Responsive to determining the existence of a subscription version record (or other type of record that indicates a porting event initiated by a subscriber), the institution may permit the transaction to proceed. On the other hand, responsive to determining that a subscription version record does not exist, the financial institution may challenge the purported subscriber's identity and, perhaps, terminate the transaction. Preventing fraudulent transactions may bring about a reduction in instances of identity theft, fraud related to credit cards or other instruments, circumventing of parental controls, and so on. A In FIG. 1 (embodiment 100) mobile device 102 may transmit radio signals to, and receive radio signals from, a wireless communications network. In an example, mobile device 102 may communicate with a cellular communications network by transmitting wireless signals to, and/or receiving wireless signals from, a cellular transceiver 110, which may comprise a wireless base transceiver subsystem (BTS), a Node B or an evolved NodeB (eNodeB), over wireless communication link 123. Similarly, mobile communications device 102 may transmit wireless signals to, and/or receive wireless signals from, local transceiver 115 over wireless communication link 125. A local transceiver 115 may comprise an access point (AP), femtocell, Home Base Station, small cell base station, Home Node B (HNB) or Home eNodeB (HeNB) and may provide access to a wireless local area network (WLAN, e.g., IEEE 802.11 network), a wireless personal area network (WPAN, e.g., Bluetooth® network) or a cellular network (e.g. an LTE network or other wireless wide area network, such as those discussed herein). Of course, it should be understood that these are merely examples of networks that may communicate with a mobile device over a wireless link, and claimed subject matter is not limited in this respect. In particular embodiments, cellular transceiver 110, local transceiver 115, satellite 114, and PSTN 150 represent touchpoints, which permit mobile device 102 to interact with network 130.

Examples of network technologies that may support wireless communication link 123 are GSM, Code Division Multiple Access (CDMA), Wideband CDMA (WCDMA), Long Term Evolution LTE), High Rate Packet Data (HRPD). GSM, WCDMA and LTE are technologies defined by 3GPP. CDMA and HRPD are technologies defined by the $3^{rd}$ Generation Partnership Project 2 (3GPP2). WCDMA is also part of the Universal Mobile Telecommunications System (UMTS) and may be supported by an HNB. Cellular transceivers 110 may comprise deployments of equipment providing subscriber access to a wireless telecommunication network for a service (e.g., under a service contract). Here, a cellular transceiver 110 may perform functions of a cellular base station in servicing subscriber devices within a cell determined based, at least in part, on a range at which the cellular transceiver 110 is capable of providing access service. Examples of radio technologies that may support wireless communication link 125 are IEEE 802.11, BT and LTE.

In a particular implementation, cellular transceiver 110 and local transceiver 115 may communicate with server 140, such as by way of network 130 through communication links 145. Here, network 130 may comprise any combination of wired or wireless links and may include cellular transceiver 110 and/or local transceiver 115 and/or server 140. In a particular implementation, network 130 may comprise Internet Protocol (IP) or other infrastructure capable of facilitating communication between mobile device 102 at a call source and server 140 through local transceiver 115 or cellular transceiver 110. In an embodiment, network 130 may also facilitate communication between mobile device 102, server 140 and a PSTN 150, for example through communications link 160. In another implementation, network 130 may comprise a cellular communication network infrastructure such as, for example, a base station controller or packet based or circuit based switching center (not shown) to facilitate mobile cellular communication with mobile device 102. In a particular implementation, network 130 may comprise local area network (LAN) elements such as WiFi APs, routers and bridges and may, in such an instance, comprise links to gateway elements that provide access to wide area networks such as the Internet. In other implementations, network 130 may comprise a LAN and may or may not involve access to a wide area network but may not provide any such access (if supported) to mobile device 102. In some implementations, network 130 may comprise multiple networks (e.g., one or more wireless networks and/or the Internet). In one implementation, network 130 may include one or more serving gateways or Packet Data Network gateways. In addition, one or more of server 140 may comprise an E-SMLC, a Secure User Plane Location (SUPL) Location Platform (SLP), a SUPL Location Center (SLC), a SUPL Positioning Center (SPC), a Position Determining Entity (PDE) and/or a gateway mobile location center (GMLC), each of which may connect to one or more location retrieval functions (LRFs) and/or mobility management entities (MMEs) of network 130.

In particular embodiments, communications between mobile device 102 and cellular transmitter 110, satellite 114, local transceiver 115, and so forth may occur utilizing signals communicated across wireless communications channels. Accordingly, the term "signal" may refer to communications utilizing propagation of electromagnetic waves across wireless communications channels. Signals may be modulated to convey messages utilizing one or more techniques such as amplitude modulation, frequency modulation, binary phase shift keying (BPSK), quaternary phase shift keying (QPSK) along with numerous other modulation techniques, and claimed subject matter is not limited in this respect. Accordingly, as used herein, the term "messages" refers to parameters, such as binary signal states, which may be encoded in a signal using one or more of the above-identified modulation techniques.

In particular implementations, and as discussed below, mobile device 102 may comprise circuitry and processing resources capable of obtaining location related measurements (e.g. for signals received from GPS or other Satellite Positioning System (SPS) satellites 114), cellular transceiver 110 or local transceiver 115 and possibly computing a position fix or estimated location of mobile device 102 based on these location related measurements. In some implementations, location related measurements obtained by mobile device 102 may be transferred to a location server such as an enhanced serving mobile location center (E-SMLC) or SUPL location platform (SLP) (e.g. which may comprise a server, such as server 140) after which the location server may estimate or determine an estimated location for mobile device 102 based on the measurements. In the presently illustrated example, location related measurements obtained by mobile device 102 may include measurements of signals (124) received from satellites belonging to an SPS or Global Navigation Satellite System (GNSS) such as GPS, GLONASS, Galileo or Beidou and/or may include measurements of signals (such as 123 and/or 125) received from terrestrial transmitters fixed at known locations (e.g., such as cellular transceiver 110).

Mobile device 102 or a separate location server may obtain a location estimate for mobile device 102 based on location related measurements using any one of several position methods such as, for example, GNSS, Assisted GNSS (A-GNSS), Advanced Forward Link Trilateration (AFLT), Observed Time Difference Of Arrival (OTDOA) or Enhanced Cell ID (E-CID) or combinations thereof. In some of these techniques (e.g. A-GNSS, AFLT and OTDOA), pseudoranges or timing differences may be measured at mobile device 102 relative to three or more terrestrial transmitters fixed at known locations or relative to four or more satellites with accurately known orbital data, or combinations thereof, based at least in part, on pilots, positioning reference signals (PRS) or other positioning related signals transmitted by the transmitters or satellites and received at mobile device 102. Here, server 140 may be capable of providing positioning assistance data to mobile device 102 including, for example, information regarding signals to be measured (e.g., signal timing), locations and identities of terrestrial transmitters and/or signal, timing and orbital information for GNSS satellites to facilitate positioning techniques such as A-GNSS, AFLT, OTDOA and E-CID. For example, server 140 may comprise an almanac to indicate locations and identities of cellular transceivers and/or local transceivers in a particular region or regions such as a particular venue, and may provide information descriptive of signals transmitted by a cellular base station or AP such as transmission power and signal timing. In the case of E-CID, mobile device 102 may obtain measurements of signal strengths for signals received from cellular transceiver 110 and/or local transceiver 115 and/or may obtain a round trip signal propagation time (RTT) between mobile device 102 and a cellular transceiver 110 or local transceiver 115. A mobile device 102 may use these measurements together with assistance data (e.g. terrestrial almanac data or GNSS satellite data such as GNSS Almanac and/or GNSS Ephemeris information) received from server 140 to determine a location estimate for mobile device 102 or may transfer the measurements to server 140 to perform the same determination. A call from mobile device 102 may be routed, based on the location of mobile device 102, and connected to PSTN 150, for example, via wireless communication link 123 and communications link 160.

A mobile device at a call source (e.g., mobile device 102 of FIG. 1) may be referred to as a wireless device, a mobile terminal, a terminal, a mobile station (MS), a user equipment (UE), a SUPL Enabled Terminal (SET) or by some other name and may correspond to a cellphone, smartphone, laptop, tablet, PDA, tracking device or some other portable or moveable device. Typically, though not necessarily, a mobile device may support wireless communication such as using GSM, WCDMA, LTE, CDMA, HRPD, WiFi, BT, WiMax, etc. A mobile device may also support wireless communication using a wireless LAN (WLAN), DSL or packet cable for example. A mobile device may comprise a single entity or may comprise multiple entities such as in a personal area network where a user may employ audio, video and/or data I/O devices and/or body sensors and a separate wireline or wireless modem. An estimate of a location of a mobile device (e.g., mobile device 102) may be referred to as a location, location estimate, location fix, fix, position, position estimate or position fix, and may be geographic, thus providing location coordinates for the mobile device (e.g., latitude and longitude) which may or may not include an altitude component (e.g., height above sea level, height above or depth below ground level, floor level or basement level).

The architecture of the cellular communications network described in relation to FIG. 1 may comprise a generic architecture that is capable of accommodating a variety of outdoor and indoor location solutions including the standard SUPL user plane location solution defined by the Open Mobile Alliance (OMA) and standard control plane location solutions defined by 3GPP and 3GPP2. For example, server 140 may function as (i) a SUPL location platform to support the SUPL location solution, (ii) an E-SMLC to support the 3GPP control plane location solution with LTE access on wireless communication link 123 or 125, or (iii) a Standalone Serving Mobile Location Center (SAS) to support the 3GPP Control Plane Location solution for UMTS.

Figure 2:
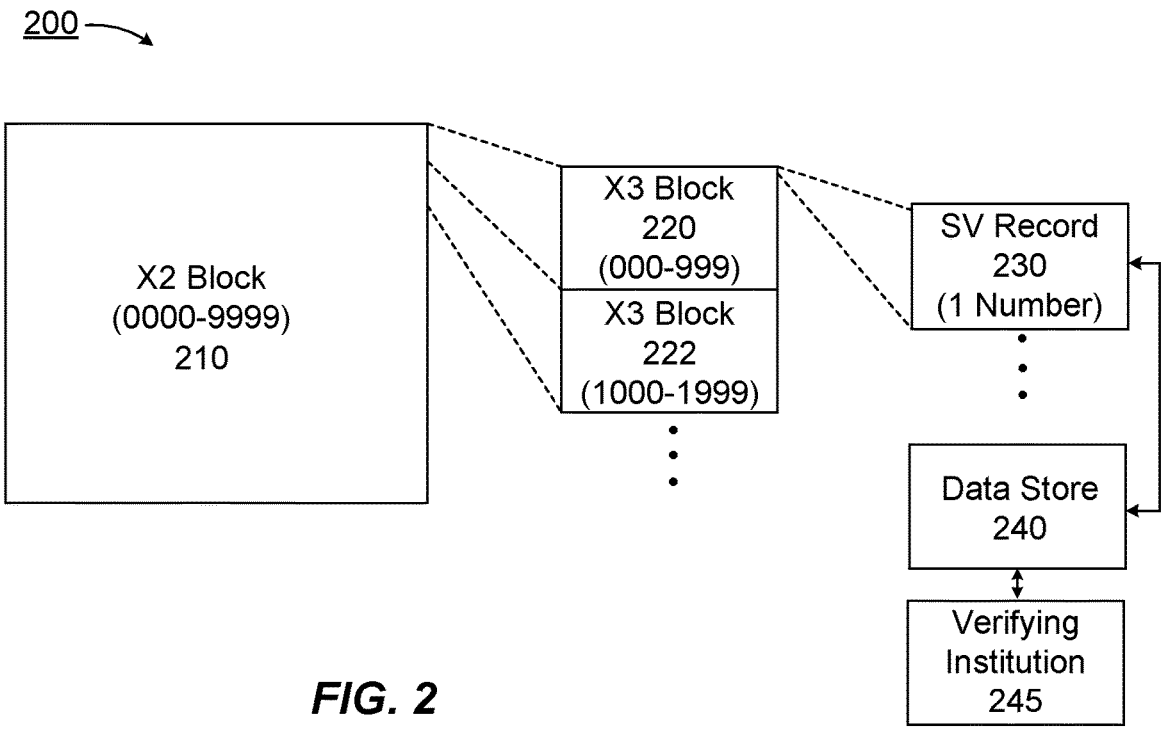
FIG. 2 shows assignment of subscriber account identifier blocks in a telecommunications infrastructure, according to an embodiment.

In view of the communications infrastructure shown and described in reference to FIG. 1, more particular embodiments directed toward reducing the risk of fraud and deception involving a subscriber account identifier that corresponds to the subscriber's mobile communications device are discussed hereinbelow. Hence, FIG. 2 (embodiment 200) shows assignment of a subscriber account identifier blocks in a telecommunications infrastructure, according to an embodiment. In the embodiment of FIG. 2, X2 block (0000-9999) 210 represents a block of four-digit suffixes in a 3-3-4 North American numbering plan. Accordingly, X2 block (0000-9999) 210 includes, for example, the last four digits of a block of telephone numbers, such as 212-555-0000 through 212-555-9999. In particular embodiments, such 10,000-value number blocks may be assigned to a particular communication services carrier. Accordingly, in one example, a first ten-thousand-value number block (e.g., 212-555-0000 through 212-555-9999) may be assigned to a first communication services carrier, while 212-556-0000 may be assigned to a second communication services carrier. Thus, in accordance with the North American numbering plan, a large number of number blocks may be assigned to a correspondingly large number of individual communication services carriers, which may include dozens of services carriers, hundreds of services carriers, thousands of services carriers, virtually without limitation.

Also shown in FIG. 2 is X3 block 220 and X3 block 222. X3 block 220 and X3 block 222 represent smaller divisions of X2 block 210, such as in which X3 blocks 220 and 222 comprise 1000-value number blocks. Accordingly, in the embodiment of FIG. 2, 10×3 blocks are possible, so as to divide X2 block 210 into 10 (e.g., equal-sized) subdivisions. It should be noted that in particular embodiments, X2 block 210 may be divided into differently-sized subdivisions, such as subdivisions comprising 50-value number blocks, 75-value number blocks, or number blocks that include any other subdividing scheme, and claimed subject matter is not limited in this respect. Further, although X2 block 210 is identified as comprising a 10,000-value block, embodiments of claimed subject matter are intended to embrace blocks having a different number of possible values, such as blocks including 500 possible values, 400 possible values, 300 possible values, 250 possible values, and so forth.

As previously discussed herein, a transfer may occur responsive to a subscriber of a mobile communications device may initiating porting of a subscriber account identifier from a first communication services carrier to a second communication services carrier. In particular embodiments, a subscriber may initiate a porting operation by contacting a second communication services carrier and requesting that a subscriber account identifier be ported from the first services carrier to the second services carrier. Responsive to such request, the second services carrier may generate a record of such request, such as a subscription version (SV) record 230, with data store 240. In particular embodiments, data store 240 may provide access to a nationwide number portability entity such as the Number Portability Administration Center, having a physical address at Neustar, Inc., 21575 Ridgetop Circle, Sterling, Va. 20166. In the embodiment of FIG. 2, data store 240 may provide access to a record to indicate that a mobile communications device corresponding to a particular subscriber account identifier (e.g., a mobile telephone number) has undergone a subscriber-initiated porting from a first communication services carrier to a second communication services carrier.

Thus, in response to a subscriber attempting to engage in a transaction (e.g., a financial transaction), the institution (e.g., a financial institution) may access data store 240, which may store records related to events with respect to the subscriber's mobile communications device. Such records of events may relate to number transfer (e.g., porting events), removal and/or replacement of a subscriber identity module (SIM), replacement of a subscriber's actual mobile device (e.g., subscriber tenure), occurrences of a password reset, as well as other deterministic events. In particular embodiments, such deterministic events may bear on an institution's ability to authenticate, authorize, and/or verify a subscriber. Thus, in particular embodiments, a mobile subscriber who has recently (e.g., within a time window corresponding to the last week, the last two weeks, the last month, the last two months, the last three months, the last six months, the last year, etc.) ported a subscriber account identifier may be assigned a decreased measure of trustworthiness. In some instances, a decreased measure of trustworthiness may negatively impact an institution's ability to authenticate, authorize, and/or verify a subscriber. In contrast, a subscriber who has refrained from porting a subscriber account identifier among service carriers for a recent time window (e.g., one week, two weeks, one month, two months, three months, six months, one year, etc.) be assigned an increased measure of overall trustworthiness.

In the embodiment of FIG. 2, verifying institution 245 may represent a financial institution, for example, seeking to assess the trustworthiness of a subscriber. Accordingly, verifying institution 245 may access data store 240 for the purposes of detecting whether certain deterministic events, such as a transfer (e.g., a porting) of a subscriber account identifier has recently occurred. Responsive to retrieving parameters from data store 240, including records of one or more subscriber-initiated porting events, a transaction may be allowed to continue. In particular embodiments, such records may comprise a pre-port record, which documents the parameters in connection with a subscriber-initiated porting event. A pre-port record retrieved from data store 240 may be utilized to authenticate, authorize, and/or verify the ownership and/or correspondence of a subscriber account identifier with a particular subscriber even though the subscriber may have recently initiated a porting event. Conversely, at least in some embodiments, responsive to a pre-port record being absent or missing from data store 240, authentication, authorization, and/or verification of the ownership and/or correspondence of a subscriber account identifier with a particular subscriber may not be possible. In some embodiments, absence of the pre-port record may bring about a challenge to a putative mobile subscriber so that additional subscriber parameters can be obtained. Conversely, in particular embodiments, in response to data store 240 failing to indicate presence of a porting record for a particular subscriber, a financial institution, for example, may deny the authentication, authorization, and/or verification of a subscriber.

Figure 3:
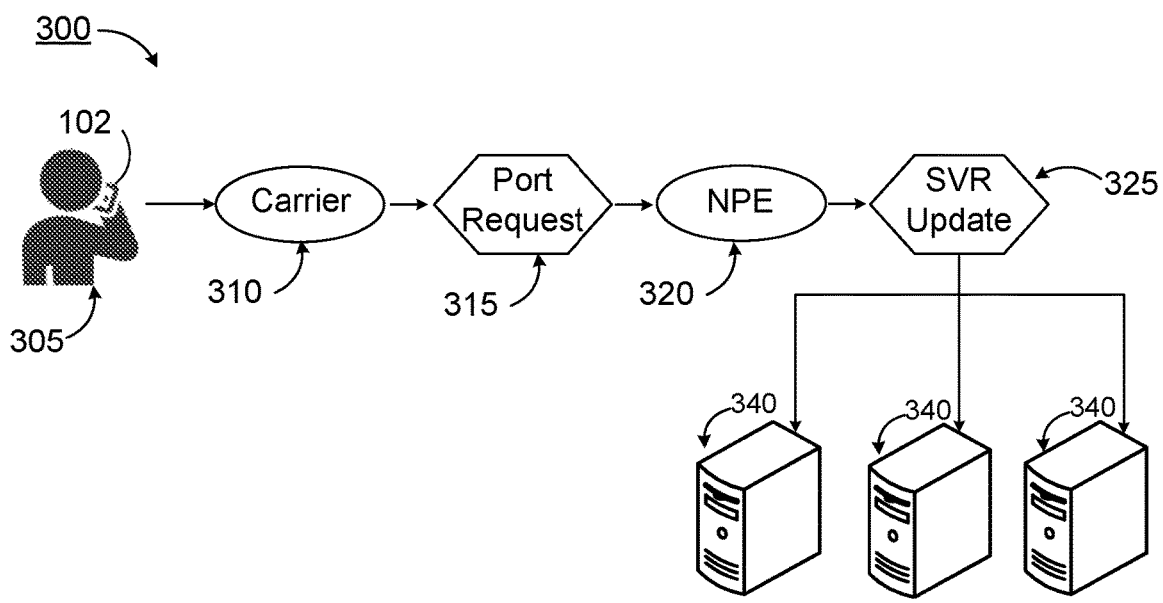
FIG. 3 shows a simplified process of initiating a porting request in a telecommunications infrastructure, according to an embodiment.

FIG. 3 shows a simplified process of initiating a porting request in a telecommunications infrastructure, according to an embodiment 300. In the embodiment of FIG. 3, subscriber 305 maintains a subscriber account identifier with a first communication services carrier. Accordingly, subscriber 305 receives wireless communication services from the first communication services carrier. In the embodiment of FIG. 3, subscriber 305 initiates porting request 315, such as from the first communication services carrier to a second communication services carrier by utilizing a mobile device 102 to contact second mobile communication services carrier 310. Responsive to receiving such request made by subscriber 305, second mobile communication services carrier 310 may generate a porting request for transmission to number porting entity (NPE) 320. As mentioned previously herein, number porting entity 320 may correspond to a nationwide number portability administration center, which may acquire, process, and store records related to the transfer and/or porting of subscriber account identifiers, such as mobile telephone numbers, for example. In other embodiments number porting entity 320 may operate to acquire, process, and store records related to the transfer (e.g., porting) operations of other types of subscriber account identifiers, such as email addresses, or any other type of unique (or at least relatively unique) identifier utilized to establish a correspondence between subscriber 305 and mobile device 102.

In the embodiment of FIG. 3, responsive to receipt of a porting request from subscriber 305, number porting entity 320 may generate a subscription version record, which documents the subscriber-initiated request to transfer (e.g., port) the subscriber's account identifier from the first communication services carrier to the second communication services carrier. In particular embodiments, a subscription version record identifies a particular subscriber account identifier as no longer being connected, associated, and/or affiliated with, for example, X2 block 210 or with X3 block 220. In response to the generation of subscription version record 325, servers 340, which represent internetworked computing resources of a telecommunications network begin to identify the transferred (e.g., ported) subscriber account identifier as being managed by second communication services carrier 310. Accordingly, in the embodiment of FIG. 3, a telephone call placed to a particular subscriber utilizing the subscriber's account identifier (e.g., utilizing the subscriber's mobile telephone number) is facilitated by the telecommunications network, such as that of FIG. 1, under the management and/or control of the second communication services carrier.

Figure 4:
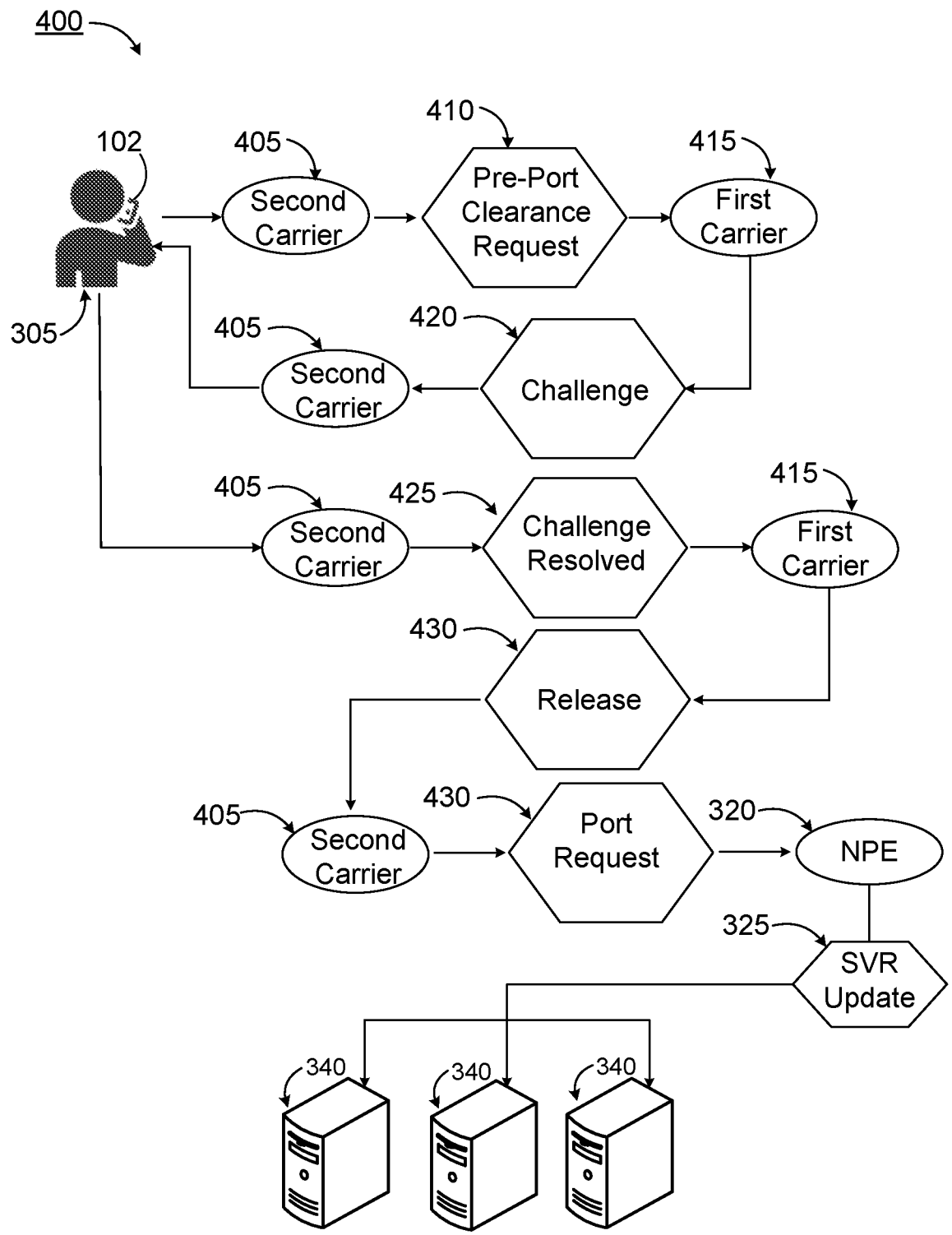
FIG. 4 shows another process of initiating a porting request within a telecommunications infrastructure, according to an embodiment.

FIG. 4 shows another process of initiating a porting request within a telecommunications infrastructure, according to an embodiment (400). In FIG. 4, subscriber 305, who may currently be a subscriber of first communication services carrier 415, contacts second communication services carrier 405. Subscriber 305 may initiate a porting operation of the subscriber account identifier (e.g., a telephone number of mobile device 102) with second communication services carrier 405. As mentioned previously herein, subscriber 305 may initiate a porting operation of a subscriber account identifier to obtain a more competitive subscriber fee structure, an increased geographical area within which wireless services may be obtained, enhanced voice quality, etc. Responsive to the porting request, second communication services carrier 405 may generate pre-port clearance request 410 for transmission to first communication services carrier 415.

Responsive to receipt of pre-port clearance request 415, first communication services carrier 415 may generate challenge 420. In particular embodiments, first communication services carrier 415 may generate challenge 420 to indicate, for example, a reluctance to release the subscriber account identifier to another communication services carrier. In some instances, such reluctance may be based on any number of reasons, such as subscriber 305 currently not being current (e.g., delinquent) on required wireless services fees. In other instances, a reluctance to release a subscriber account identifier from a first communication services carrier to a second such carrier may be related to subscriber 305 attempting to port a business phone number to a personal phone number. First communication services carrier 415 may generate challenge 420 for any number of additional reasons, and claimed subject matter is not limited in this respect.

In response to receipt of challenge 420, second communication services carrier 405 may forward challenge 420 to subscriber 305. Subscriber 305 may, in turn, respond to challenge 420, perhaps by remunerating an agreed-to amount, for example, so as to settle an outstanding balance. In other embodiments, subscriber 305 may provide a satisfactory response to second communication services carrier 405 by performing other actions, and claimed subject matter is not limited in this respect. Responsive to successful resolution of challenge 420, as indicated by challenge resolved module 425, first communication services carrier 415 may select to release the subscriber account identifier, thereby permitting the identifier to be transferred (e.g., ported) to a second communication services carrier 405. After obtaining permission to port the subscriber account identifier, second communication services carrier 405 may generate port request 430, which may be forwarded to number porting entity (NPE) 320. Number porting entity 320 may subsequently generate subscription version record 325. Responsive to generation of subscription version record 325, internetworked computing resources of telecommunications infrastructure (as represented by servers 340) may begin identifying the ported a subscriber account identifier as being managed by second communication services carrier 405.

The process outlined in FIG. 4, in which subscriber 305 initiates a porting operation from a first services carrier to a second services carrier, may result in the generation of documentation of such porting via subscription version record 325. Accordingly, such as in response to subscriber 305 attempting to engage in a financial transaction, for example, subscription version record 325 may be made available to indicate that such porting was performed at the request of subscriber 305. In contrast, such as in response to a mobile communication services termination of a subscriber account identifier, no subscription version record 325 is generated. A service termination may correspond to a snapback event involving disconnection of a telephone number or may involve any other type of service carrier-initiated termination. Accordingly, in such instances, in response to subscriber 305 attempting to engage in a financial transaction, for example, an absence of subscription version record 325 may indicate that, perhaps, subscriber 305 cannot be authenticated, authorized, and/or verified. In particular embodiments, an inability to authenticate, authorize, and/or verify subscriber 305 may be indicative of the subscriber attempting to fraudulently engage in a financial transaction, for example.

Figure 5:
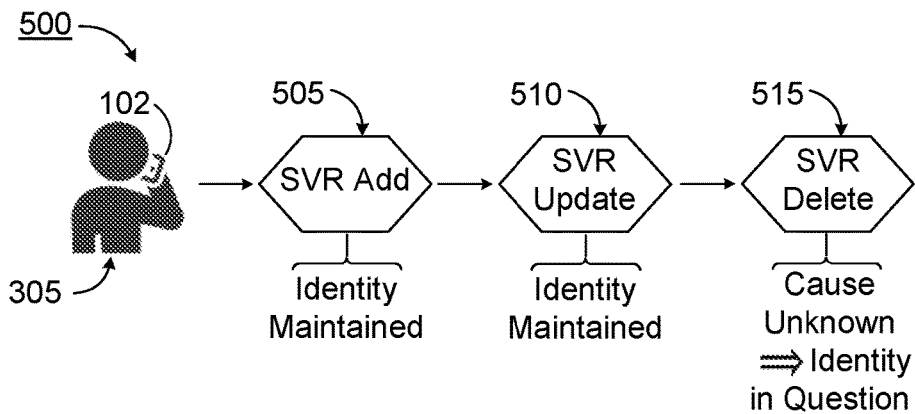
FIG. 5 shows a simplified block diagram to indicate potential loss of mobile subscriber identity parameters responsive to a porting event, according to an embodiment.

FIG. 5 shows a simplified block diagram to compare a potential loss of certainty in the identity of a mobile subscriber in response to porting processes, according to an embodiment. FIG. 5 may be compared with the simplified process of FIG. 6, in which potential loss of certainty in the identity of a mobile subscriber is precluded in response to particular embodiments of claimed subject matter. In FIG. 5 (embodiment 500) subscriber 305 contacts, for example, a second communication services carrier to initiate porting of a subscriber account identifier (e.g., a mobile telephone number). Responsive to such request, a subscription version record may be created (505). In the embodiment of FIG. 5, such subscription version record may be made available to various internetworked computing resources of a telecommunications infrastructure. At 510, a subscription version record may be updated, for example, in response to any number of subscriber-related activities, such as moving among regions within the North American continent, changes in the identification of the communication services provider (which may occur in response to a purchase or sale of a first communication services provider to a second communication services provider) and so forth.

As indicated at 515, a subscription version record being deleted, which may occur in response to a transfer of a subscriber account identifier initiated by a communication service carrier. Accordingly, 515 may indicate a port deletion, in which a services carrier has disconnected and/or disassociated a subscriber account identifier with subscriber 305. In such instances, in which a subscription version record may be deleted, authentication, authorization, and/or verification of the identity of subscriber 305 may be problematic. Accordingly, a subscriber attempting to utilize the subscriber account identifier may be indicative of an attempt to defraud a financial institution, for example.

Figure 6:
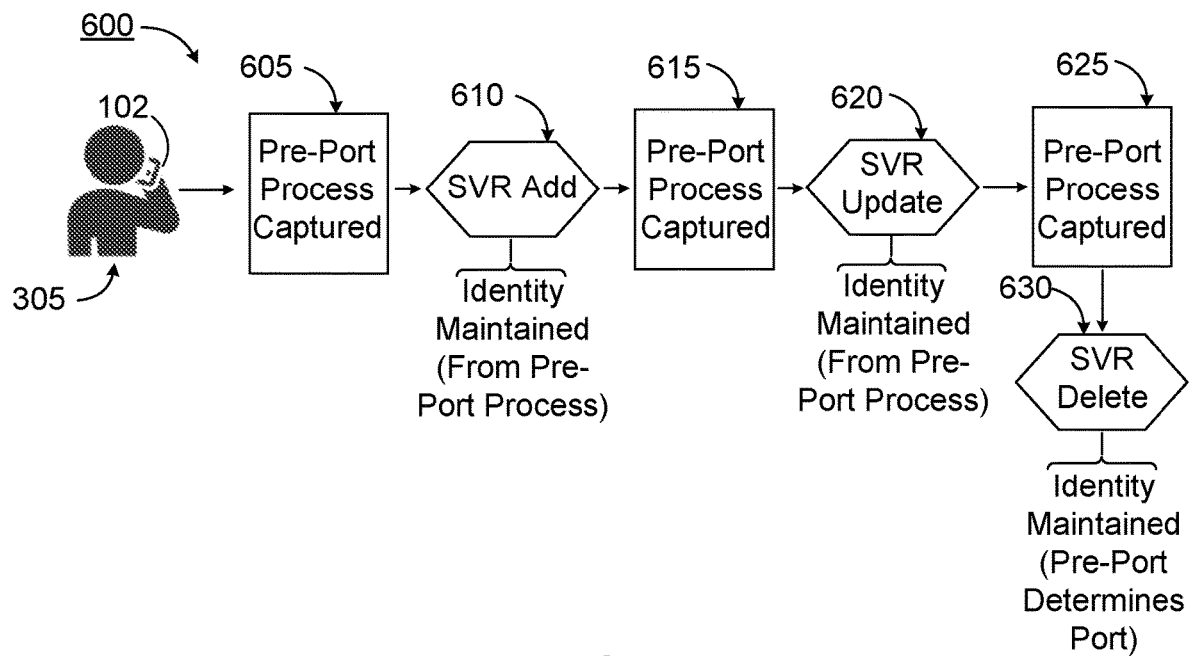
FIG. 6 shows a process of maintaining subscriber identity parameters during one or more porting events, according to an embodiment.

In contrast, as shown in FIG. 6, a potential loss of certainty in the identity of a mobile subscriber may be maintained in response to a porting process, according to an embodiment (600). In FIG. 6, subscriber 305 contacts, for example, a second communication services carrier to initiate a transfer (e.g., porting) of the subscriber account identifier (e.g., a mobile telephone number). At block 605, the pre-porting process, which may involve generating records that document the parameters involved in a porting operation initiated by a subscriber. Such documentation may be added to subscription version records at 610. Thus, at 610, the identity of subscriber 305 may be authenticated, authorized, and/or verified. At 615, which may correspond to subscriber 305 again, initiating a porting operation, pre-porting parameters are generated and stored as an update to subscription version records at 620. Such documentation may be added to subscription version records at 620. Thus, again, the identity of subscriber 305 may be authenticated, authorized, and/or verified. In the embodiment of FIG. 6, parameters related to additional pre-port process can be captured, such as at 625.

However, in response to a service carrier-initiated port delete operation (e.g., a snapback event), which may correspond to a service termination by a communication services carrier (e.g., a disconnect), at least certain subscription version records may be deleted as shown at SVR Delete 630. However, although certain subscription version records may be deleted, identity of subscriber 305 may be maintained, even though several transfers (e.g., porting) operations, including a termination of subscriber services, have occurred. Thus, in particular embodiments, if records related to porting of a subscriber account identifier have not been captured and/or certain subscription version records are deleted, it may nonetheless be possible to authenticate, authorize, and/or verify the identity of subscriber 305. In other embodiments, if records related to porting of a subscriber account identifier are not present, which may be indicative of a disconnect or snap back from a second communications service carrier to a first communication services carrier, such may be indicative of an unscrupulous individual attempting to fraudulently engage in an electronic or digital transaction.

Figure 7:
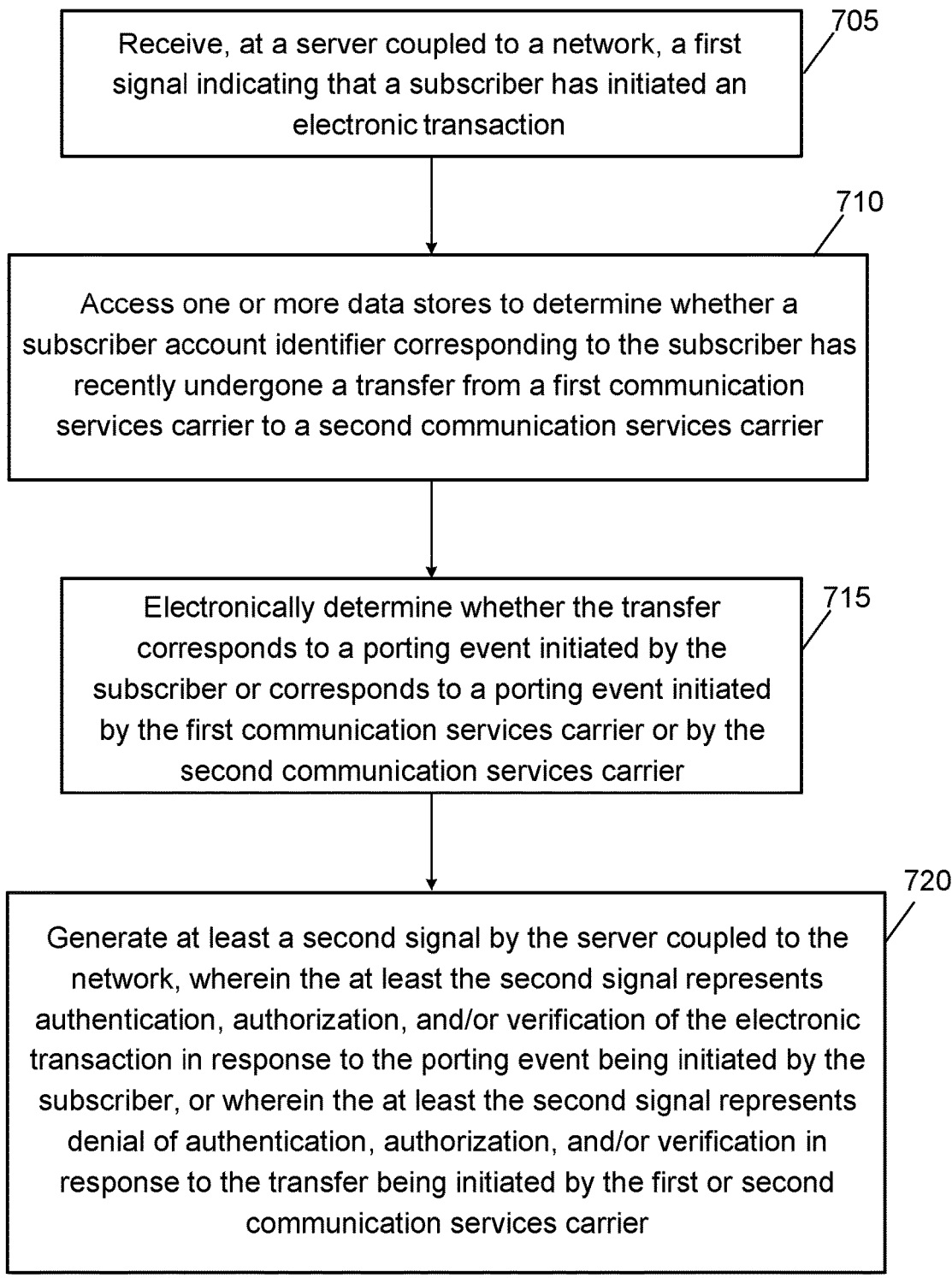
FIG. 7 shows a flow diagram for a method of pre-port detection in a communication services carrier, according to an embodiment.

FIG. 7 shows a flow diagram for a method of pre-port detection in a communication services carrier, according to an embodiment (700). It should be noted that the disclosed embodiments, such as the embodiment of FIG. 7, are intended to embrace numerous variations, including methods that may include actions in addition to those depicted in the figures, actions performed in an order different than those depicted in the figures, as well as methods including fewer steps than those depicted. The method of FIG. 7 begins at 705, which includes receiving, at a server coupled to a communications network, a first signal indicating that a subscriber of a mobile communications device has initiated an electronic or digital transaction. 705 may involve a calling party, such as subscriber 305 of FIG. 3, attempting to initiate an electronic or digital transaction, such as an electronic financial transaction, by contacting a bank, brokerage, or other institution. A mobile subscriber, such as subscriber 305, may operate any type of mobile cellular communications device, a VoIP device, or any other wireless or wireline communications device.

The method of FIG. 7 may continue at 710, which may involve accessing one or more data stores to determine whether a subscriber account identifier has recently undergone a transfer (e.g., a porting operation involving a mobile subscriber telephone number) from a first communication services carrier to a second communication services carrier. A recent transfer may correspond to a transfer made within the previous one week period, the previous two week period, the previous one month period, the previous two month period, the previous six month period, the previous one-year period, or within any other appropriate window of time, and claimed subject matter is not limited in this respect. The method may continue at 715, which may involve detecting whether the transfer corresponds to a porting event initiated by a subscriber or corresponds to a porting event initiated by the communication services carrier. A porting operation initiated by a communication services carrier may correspond to a service termination (e.g., a disconnection and/or snapback) of a subscriber account identifier (e.g., a mobile telephone number), or may involve other types of events initiated by a communication services carrier, and claimed subject matter is not limited in this respect. At 720, the server coupled to the network may generate at least a second signal, wherein the at least the second signal operates to authenticate, authorize, and/or verify the transaction in response to the transfer being initiated by the subscriber. Alternatively, the at least the second signal may represent a denial of authentication, authorization, and/or verification in response to the transfer being initiated by the communication services carrier.

Figure 8:
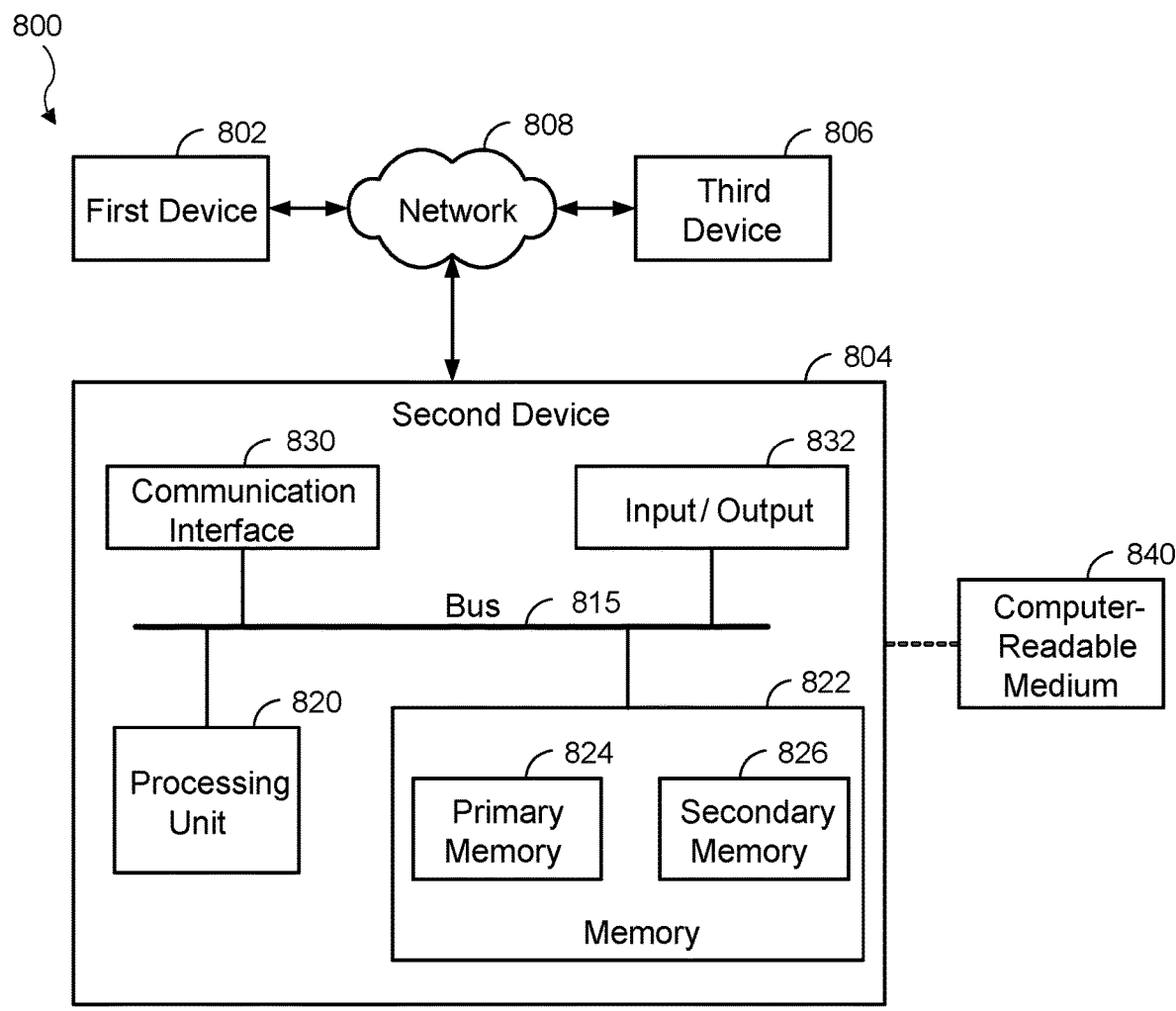
FIG. 8 is a diagram showing a computing environment, according to an embodiment.

FIG. 8 is a diagram showing a computing environment, according to an embodiment 800. In the embodiment of FIG. 8, first and third devices 802 and 806 may be capable of rendering a graphical user interface (GUI) for a network device, such as server device 140 of FIG. 1, so that a subscriber utilizing a mobile communications device may engage in system use. Device 804 may potentially serve a similar function in this illustration. Likewise, in FIG. 8, computing device 802 ('first device' in FIG. 8) may interface with computing device 804 ('second device' in FIG. 8), which may, for example, also comprise features of a client computing device and/or a server computing device, in an embodiment. Processor (e.g., processing device) 820 and memory 822, which may comprise primary memory 824 and secondary memory 826, may communicate by way of a communication interface 830, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 804, as depicted in FIG. 8, is merely one example, and claimed subject matter is not limited in scope to this particular example.

In FIG. 8, computing device 802 may provide one or more sources of executable computer instructions in the form of physical states and/or signals (e.g., stored in memory states), for example. Computing device 802 may communicate with computing device 804 by way of a network connection, such as via network 808, for example. As previously mentioned, a connection, while physical, may be virtual while not necessarily being tangible. Although computing device 804 of FIG. 8 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 822 may comprise any non-transitory storage mechanism. Memory 822 may comprise, for example, primary memory 824 and secondary memory 826, additional memory circuits, mechanisms, or combinations thereof may be used. Memory 822 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 822 may comprise one or more articles utilized to store a program of executable computer instructions. For example, processor 820 may fetch executable instructions from memory and proceed to execute the fetched instructions. Memory 822 may also comprise a memory controller for accessing device readable-medium 840 that may carry and/or make accessible digital content, which may include code, and/or instructions, for example, executable by processor 820 and/or some other device, such as a controller, as one example, capable of executing computer instructions, for example. Under direction of processor 820, a non-transitory memory, such as memory cells storing physical states (e.g., memory states), comprising, for example, a program of executable computer instructions, may be executed by processor 820 and able to generate signals to be communicated via a network, for example, as previously described. Generated signals may also be stored in memory, also previously suggested.

Memory 822 may store electronic files and/or electronic documents, such as relating to one or more users, and may also comprise a computer-readable medium that may carry and/or make accessible content, including code and/or instructions, for example, executable by processor 820 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

Processor 820 may comprise one or more circuits, such as digital circuits, to perform at least a portion of a computing procedure and/or process. By way of example, but not limitation, processor 820 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 820 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 8 also illustrates device 804 as including a component 832 operable with input/output devices, and communication bus 815, for example, so that signals and/or states may be appropriately communicated between devices, such as device 804 and an input device and/or device 804 and an output device. A user may make use of an input device, such as a computer mouse, stylus, track ball, keyboard, and/or any other similar device capable of receiving user actions and/or motions as input signals. Likewise, for a device having speech to text capability, a user may speak to generate input signals. Likewise, a user may make use of an output device, such as a display, a printer, etc., and/or any other device capable of providing signals and/or generating stimuli for a user, such as visual stimuli, audio stimuli and/or other similar stimuli.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Additionally, in the present patent application, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance, between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall with the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modelled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices and/or one or more server devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device and/or a client device, as well as other types of devices, including between wired and/or wireless devices coupled via a wired and/or wireless network, for example.

In the context of the present patent application, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

In the context of the present patent application, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present patent application, the term "transparent," if used with respect to devices of a network, refers to devices communicating via the network in which the devices are able to communicate via one or more intermediate devices, such as one or more intermediate nodes, but without the communicating devices necessarily specifying the one or more intermediate nodes and/or the one or more intermediate devices of the one or more intermediate nodes and/or, thus, may include within the network the devices communicating via the one or more intermediate nodes and/or the one or more intermediate devices of the one or more intermediate nodes, but may engage in signal communications as if such intermediate nodes and/or intermediate devices are not necessarily involved. For example, a router may provide a link and/or connection between otherwise separate and/or independent LANs.

The term electronic file and/or the term electronic document are used throughout this document to refer to a set of stored memory states and/or a set of physical signals associated in a manner so as to thereby, at least logically, form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IOT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). As suggested previously, a computing device and/or a networking device may also have a subscriber identity module (SIM) card, which, for example, may comprise a detachable or embedded smart card that is able to store subscription content of a user, and/or is also able to store a contact list. It is noted, as previously mentioned, that a SIM card may also be electronic in the sense that it may simply be sorted in a particular location in memory of the computing and/or networking device. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter

What is claimed is:

1. A method comprising:
    receiving, at a server coupled to a network, a first signal indicating that a subscriber has initiated an electronic transaction;
    accessing one or more data stores to determine whether a subscriber account identifier corresponding to the subscriber has recently been transferred from a first communication services carrier to a second communication services carrier;
    electronically determining whether the transfer corresponds to a porting event initiated by the subscriber or corresponds to a porting event initiated by the first communication services carrier or by the second communication services carrier; and
    generating at least a second signal by the server coupled to the network,
    wherein the at least the second signal represents one of:
        authentication of the electronic transaction in response to the porting event being initiated by the subscriber; and
        a denial of the authentication in response to the porting event being initiated by the first communication services carrier or by the second communication services carrier,
    wherein the porting event initiated by the subscriber corresponds to a request by the subscriber to port the subscriber account identifier from the first communication services carrier to the second communication services carrier.

2. The method of claim 1, wherein the electronic transaction corresponds to a transaction that provides access to privileged content and wherein the denial corresponds to denying access to the privileged content.

3. The method of claim 1, wherein the electronic transaction comprises accessing parameters relating to at least one of the following: a service account, a financial account, an account relating to medical information, an account relating to access to premium content, an account that provides purchase and/or rental of goods and/or services, access to corporate or organizational intellectual property; or any combination thereof.

4. The method of claim 1, wherein the porting event initiated by the second communication services carrier corresponds to a snapback event.

5. The method of claim 1, further comprising requesting, by the server coupled to the network, one or more additional parameters from the subscriber, after generating the at least the second signal representing the denial of the authentication.

6. The method of claim 5, further comprising generating an authentication signal in response to obtaining the one or more additional parameters from the subscriber.

7. The method of claim 1, wherein the subscriber account identifier corresponds to a telephone number.

8. The method of claim 1, wherein the at least the second signal representing the denial of the authentication is generated, at least in part, responsive to the second communication services carrier deleting at least a portion of a subscription version record corresponding to the subscriber account identifier.

9. The method of claim 1, wherein the at least the second signal representing the denial of the authentication is generated, at least in part, responsive to the second communication services carrier porting the subscriber account identifier to a subsidiary of the second communication services carrier.

10. The method of claim 1, wherein the transfer corresponds to a transfer of the subscriber account identifier occurring within a time window.

11. A server, comprising:
at least one processor communicatively coupled to at least one memory to:
initiate reception, from a communications network, of at least a first signal to indicate that a subscriber of a mobile communication services carrier has initiated an electronic transaction;
detect, via accessing one or more data stores, an occurrence of a recent transfer of a subscriber account identifier;
determine, responsive to detecting the recent transfer, whether the recent transfer corresponds to one of: a porting event initiated by a subscriber; and a porting event initiated by a communication services carrier; and to
transmit at least a second signal on the communications network, the at least the second signal to indicate a status of authentication of the electronic transaction responsive to determining one of: the recent transfer corresponding to a porting event initiated by a subscriber; and the recent transfer corresponding to an event initiated by a communication services carrier,
wherein the porting event initiated by the communication services carrier corresponds to a transfer of the subscriber account identifier from a first communication services carrier to a second communication services carrier.

12. The server of claim 11, wherein the event initiated by the communication services carrier corresponds to a deletion of at least a portion of a subscription version record corresponding to the subscriber account identifier.

13. The server of claim 12, wherein the subscriber account identifier corresponds to a telephone number.

14. The server of claim 11, wherein the at least the second signal is to indicate authentication of the electronic transaction responsive to determining that the recent transfer corresponds to the porting event being initiated by the subscriber.

15. The server of claim 11, wherein the at least the second signal is to indicate denial of authentication of the electronic transaction responsive to determining that the recent transfer corresponds to an event initiated by the communication services carrier.

16. An article comprising:
a non-transitory storage medium having instructions stored thereon executable by a special-purpose computing platform to:
initiate reception, from a communications network, of at least a first signal to indicate that a subscriber has initiated an electronic transaction;
detect, via accessing one or more data stores, an occurrence of a recent transfer of a subscriber account identifier;
determine, responsive to detecting the recent transfer, whether the recent transfer corresponds to one of: a porting event initiated by a subscriber; and a porting event initiated by a communication services carrier; and to
transmit an approval signal on the communications network, the approval signal to indicate authentication of the electronic transaction based, at least in part, on a determination that the recent transfer corresponds to the porting event being initiated by the subscriber,
wherein the porting event initiated by the communication services carrier corresponds to a transfer of the subscriber account identifier from a first communication services carrier to a second communication services carrier.

17. The article of claim 16, wherein the executable instructions are additionally to:
transmit, on the communications network, a signal representing denial of authentication of the electronic transaction responsive to determining that the recent transfer corresponds to the communication services carrier deleting of at least a portion of a subscription version record corresponding to the subscriber account identifier.

18. The article of claim 17, wherein the executable instructions are additionally to:
transmit a request for one or more additional parameters to the subscriber; and to
transmit the approval signal on the communications network based, at least in part, on receipt of the one or more additional parameters from the subscriber.

19. The article of claim 18, wherein the subscriber account identifier corresponds to a telephone number.

* * * * *